(12) United States Patent
Melo

(10) Patent No.: US 11,046,412 B2
(45) Date of Patent: Jun. 29, 2021

(54) SYSTEM AND METHOD FOR REINFORCING AEROSTATS

(71) Applicant: André Augusto Ceballos Melo, Paraiso (BR)

(72) Inventor: André Augusto Ceballos Melo, Paraiso (BR)

( * ) Notice: Subject to any disclaimer, the term of this patent is extended or adjusted under 35 U.S.C. 154(b) by 314 days.

(21) Appl. No.: 16/090,690

(22) PCT Filed: Feb. 19, 2018

(86) PCT No.: PCT/BR2018/050036
§ 371 (c)(1),
(2) Date: Oct. 2, 2018

(87) PCT Pub. No.: WO2019/157577
PCT Pub. Date: Aug. 22, 2019

(65) Prior Publication Data
US 2020/0361590 A1    Nov. 19, 2020

(51) Int. Cl.
*B64B 1/60*    (2006.01)
(52) U.S. Cl.
CPC .................................... *B64B 1/60* (2013.01)
(58) Field of Classification Search
CPC ............... B64B 1/08; B64B 1/06; B64B 1/00
See application file for complete search history.

(56) References Cited

U.S. PATENT DOCUMENTS

| | | | | |
|---|---|---|---|---|
| 1,191,077 A | * | 7/1916 | Hermanson | B64B 1/00 244/125 |
| 1,715,829 A | * | 6/1929 | Geisler | B64B 1/00 244/125 |
| 2,083,051 A | * | 6/1937 | Chapas | B64B 1/00 244/125 |
| 4,113,206 A | * | 9/1978 | Wheeler | B64B 1/40 244/125 |
| 4,967,983 A | * | 11/1990 | Motts | B64B 1/02 136/292 |

(Continued)

FOREIGN PATENT DOCUMENTS

| | | |
|---|---|---|
| BR | 102012005303 A2 | 1/2016 |
| BR | 112014013377 A2 | 6/2017 |

(Continued)

OTHER PUBLICATIONS

International Search Report and Written Opinion of International Search Authority dated Jul. 13, 2018 of corresponding International application No. PCT/BR2018/050036; 19 pgs.

*Primary Examiner* — Brian M O'Hara
*Assistant Examiner* — Keith L Dixon
(74) *Attorney, Agent, or Firm* — Maier & Maier, PLLC

(57) ABSTRACT

A fail-safe aerostat system is discussed, for structural support and network interconnection, applicable to many systems based on lighter-than-air lift. The invention describes a system with reinforced structure and optimized connection and an integration structure (reinforcement and integration structure), reinforcing a hydrogen cell or cells with a fail-safe design. The theorized structure is strong enough to withstand explosive forces, avoiding propagation of shock wave damage and fire, and a hydrogen cell or cells automatically self-controlled, operating independently to obtain lift strength and multi-parameter control.

5 Claims, 8 Drawing Sheets

(56) References Cited

U.S. PATENT DOCUMENTS

| | | | | |
|---|---|---|---|---|
| 5,285,986 A | * | 2/1994 | Hagenlocher | B64B 1/08 |
| | | | | 244/97 |
| 5,645,248 A | * | 7/1997 | Campbell | B64B 1/00 |
| | | | | 244/125 |
| 6,056,240 A | * | 5/2000 | Hagenlocher | E04C 3/28 |
| | | | | 244/125 |
| 6,581,873 B2 | * | 6/2003 | McDermott | B64D 27/24 |
| | | | | 244/25 |
| 7,261,255 B2 | * | 8/2007 | Li | B64B 1/04 |
| | | | | 244/125 |
| 9,102,391 B2 | * | 8/2015 | Brutoco | B64B 1/62 |
| 9,266,597 B1 | * | 2/2016 | Pasternak | B64B 1/06 |
| 10,625,842 B2 | * | 4/2020 | Rapport | B64B 1/08 |
| 2005/0224638 A1 | | 10/2005 | Goodey | |
| 2010/0239797 A1 | | 9/2010 | Alavi | |
| 2012/0273608 A1 | * | 11/2012 | Jess | B64B 1/08 |
| | | | | 244/26 |

FOREIGN PATENT DOCUMENTS

| | | |
|---|---|---|
| CN | 102030099 A | 4/2011 |
| CN | 202464116 U | 10/2012 |
| CN | 103231794 A | 8/2013 |
| CN | 103274045 A | 9/2013 |
| CN | 205010464 U | 2/2016 |
| CN | 106553746 A | 4/2017 |
| CN | 206125392 U | 4/2017 |
| CN | 107031810 A | 8/2017 |

* cited by examiner

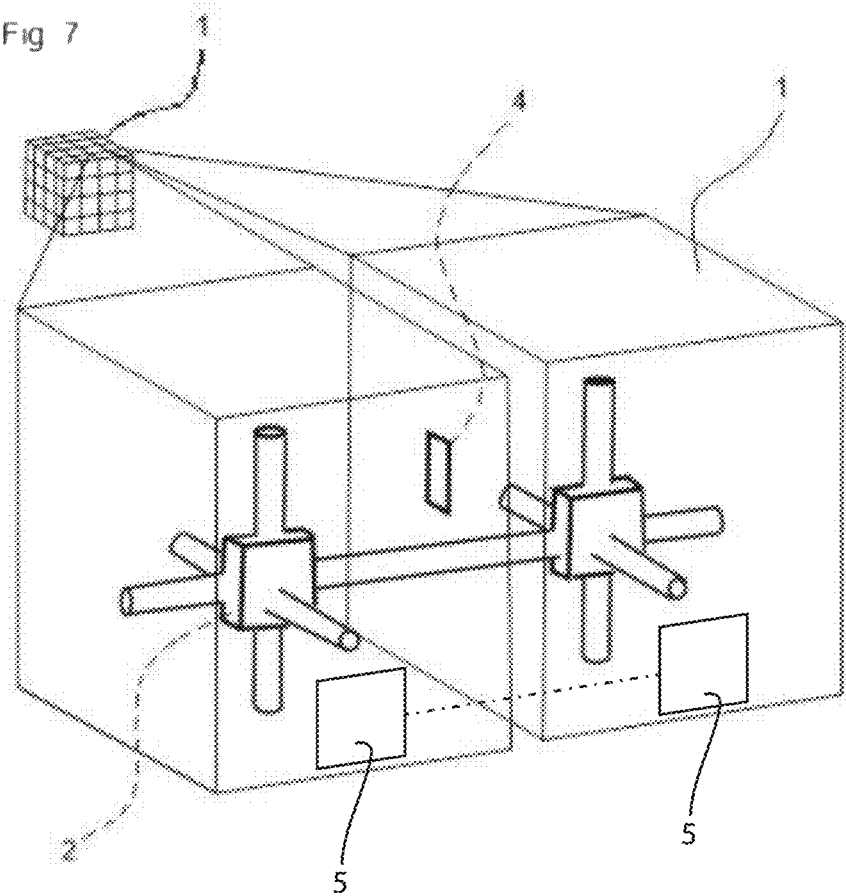

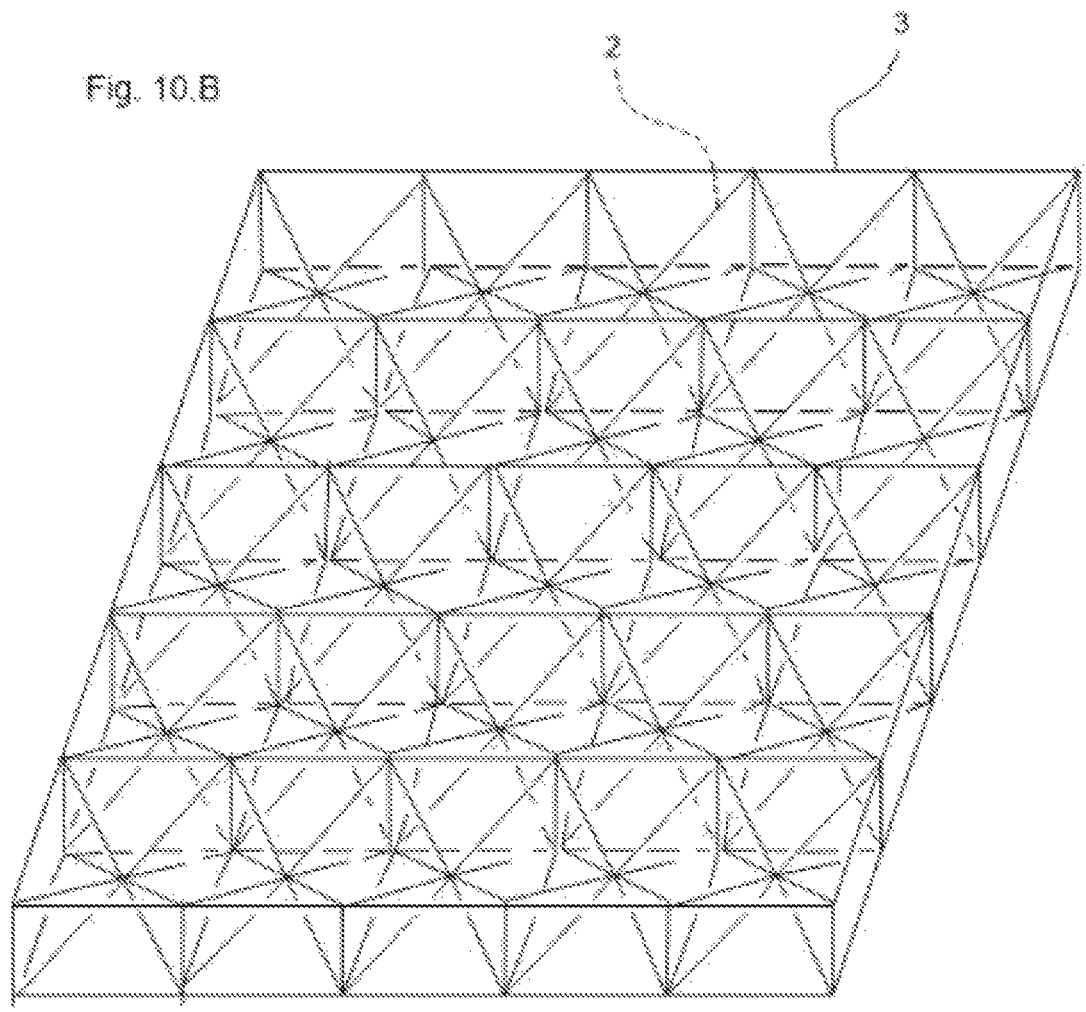
Fig. 10.B

SYSTEM AND METHOD FOR REINFORCING AEROSTATS

FIELD

A new concept of aircraft lighter than air, bringing the hydrogen safety concept to the level of materials and the design of architecture in macro and micro scales. In addition, the simplicity of the concept allows a high degree of integration providing for practical implementation of the use of hydrogen.

The technology could be applied to any aerostat. Anaerostat is an aircraft lighter than air that gains lift by using a floating gas. Aerostats gain lift by way of large envelopes filled with a lifting gas that is less dense than the surrounding air.

BACKGROUND

The two primary lifting gas used by airships are hydrogen and helium. Helium is relatively rare on Earth; however, hydrogen is the third most abundant element on the Earth's surface, chiefly in the form of chemical compounds such as hydrocarbons and water. Hydrogen is the lightest element on Earth and can be obtained easily and cost-effectively. Hydrogen has enormous potential as a clean energy source for future generation of vehicles. Climactically and environmentally clean throughout the conversion chain, right from production up to use.

The main problem with the concept of hydrogen aircraft is the flammability of hydrogen. Besides the famous Hindenburg disaster, dozens of hydrogen aircraft were destroyed by fire and no North American airship has been inflated with hydrogen since the crash of the United States Army airship in Rome in 1922. The use of hydrogen as a lifting gas for passenger aircraft was completely abandoned in the late 1930s.

The non-flammable nature of helium makes it the only practical lifting gas for lighter than air flight, but is scarce and expensive, and the use of helium can reduce the payload of a rigid aircraft by over half. The performance deficiencies of the previous state-of-the-art technologies are overcome when designing a new generation of aerostats based on the reinforcement and integration of the buoyancy structure, which may make them more secure and resilient in the face of a disaster and allow aerostats more efficient flight.

The lighter-than-air aircraft suffers tremendously around the world because it did not fundamentally improve the architecture and make hydrogen safe is the final solution in aerostats industry.

A fail-safe design which in the event of a specific type of failure responds in order to cease or minimize the damage to the structure and to other equipment, to the environment or to people. The system's design avoids or mitigates the unsafe consequences of system failure. Various embodiment forms described herein enable a safe-use approach to the aerostat with resistance to faults that levers the exceptional properties of lattice structures, the tensile integrity, the membrane structures and the porous structures called schwarzites designed with computational algorithms, while gaining lift through the use of hydrogen as floating gas. The resulting combination of economizing on hydrogen, its environmental and climatic significance and its lightness and structural strength, significantly expanding the potential of aircraft lighter than air, so as to enable broader use of aerostats.

The present invention achieves this objective by providing a platform of buoyancy which comprises a fail-safestructure, enabling the safe use of hydrogen as floating gas.

SUMMARY

This invention is focused on the structural architecture of future aircraft lighter than air. Integration and Buoyancy Structures (IBS), terminals that provide a modular and secure buoyancy platform to furnisha truly efficient architecture built with different purposes, through various interfaces of elevation with multidimensional platforms for full convergence of a lightweight architecture, with strength and aerodynamics. The IBS includes features to maximize the efficiency of the design used in the project and streamline the management of structural and material resources across the multi-modular structure.

A buoyancy platform is provided in accordance with the following considerations.

A reinforcement and integration structure (e.g. Shell Lace Shell, lattice-shell, membrane structures, tensegrity structures, lattice structure, web-like structure and schwarzite structures) increase safety and allow adjustment for different pressures in individual sessions.

More specifically, a buoyancy platform that can also be mounted in modular form, combining individual portions endowed with floatation segments and optionally with integration and reinforcement structures or the like to provide the end platform.

In addition, the simplicity of the concept allows a high degree of integration that provides for a practical implementation of the safe use of hydrogen.

At least, a hydrogen receptacle with a gas-impermeable cover element made of a pressure and fire-resistant material and can be used with a connection and integration structure. Floating bodies separated from each other and joined in a stationary manner, providing one or several cells separate from one another that can be filled with hydrogen.

The structure can be made of both flexible material (e.g. flame resistant meta-aramid), rigid materials (e.g. nanostructures of metal alloys) or semi-rigid (e.g. aerogel).

The buoyancy platform of this invention is not limited to aerostats, but can be used basically for any purpose, e.g. as a launch and landing pad, defense applications, surveillance, scientific and observational operations, a base for equipment and machinery, wind energy extraction, reduced-impact forest management, perform tasks such as near space search, keeping the costs well below the low Earth orbit satellites, carry passengers, for tourists and scientific teams, meteorological measurements. Carry instrumentation, including radio transmission, infrastructure networks, transport, logistics and distribution, passenger transport, assistance in case of disaster, emergency and rescue services, forest protection, combating fires, base for equipment and lifting devices and other purposes.

In theory, a gas other than hydrogen can be used to fill the floating bodies. Other cheap gases, such as methane, carbon monoxide, ammonia and natural gas, have even less lifting capacity and are flammable, toxic, corrosive or all three (neon is even more expensive than helium, with less lifting capacity). Operational considerations, such as whether the lifting gas can be economically obtained and produced in flight for buoyancy control (such as with hydrogen) or even produced as a by-product, affect the practical choice of the lifting gas in airworthiness projects.

For reasons of cost and feasibility, hydrogen is the gas of choice.

The materials of floating bodies are not particularly limited.

In some embodiment forms, membranes made of meta-aramid polymer can be used to provide the flexibility required, as well as sufficient resistance to pressure and tensile strength and, at the same time, ensure that the expandability is limited in pressurized state.

In some embodiment forms, the structure can be based on nano-structured metal alloys, carbon fiber, aerogel or light weight material. The mechanical properties of the material include the strength of elasticity, stretch tension, fatigue resistance, resistance to cracks and other features. Another advantage of the invention is that the entire platform can be built with lightweight components.

In some embodiment forms, the Integration and Buoyancy Structures (IBS) approach combines ultra-rigid and ultra-strong materials (such as aerogel and nano-structured metal alloys), providing greater resistance than conventional materials. Highly optimized beam architectures allow unprecedented degrees of freedom to adapt the mechanical performance of the ultralight lattice structures.

In some embodiment forms, the system will be characterized by a modular lattice structure model, where different technologies of materials such as aerogel, meta-aramid, fiber or carbon films, nanostructured metal alloys and other new materials, could be combined into a common platform to complement each other in an ideal way for different environments and lift requirements, the structural architecture to the IBS terminal of the present invention is a set of robust solutions that provide a way to build a buoyancy lifting platform through common modular components, technically referred to as "hydrogen cell (HC), Integration and Buoyancy Structures (IBS), in a more technical sense".

In some preferred embodiments, the reinforcement and integration structure is manufactured to be prismatic, and floating bodies are laid out symmetrically like honeycombs. The Lattice structures provide high rigidity to torsion and flexion at a low weight.

The honeycomb structure involves creating controlled internal limits to block the displacement movement. Such strategies invariably undermine the ductility, the ability of the material to deform, stretch or change permanently without breaking.

We propose an engineering methodology for modular projects with internal limits, especially involving lattice structures, tensegrity and membrane structures, network structures and schwarzite structures. In addition, we have discussed perspectives on the strengthening and preservation of lightness, along with possible applications to improve fault tolerance and enhance stability.

The systems composed of structural elements which themselves have lattice structure systems benefit from significantly improved mechanical properties, high strength characteristics, lightness and greater resistance the spread of cracks.

For this reason, one shape of the inventive platform is a honeycomb.

Each above mentioned structure module is an open module that is extendable, upgradable, reshapeable and removable.

It was designed to allow the aviation industry and engineers to speed up the evolution of innovative, differentiated and safe platform models for the convergence of lightness and robustness.

One embodiment form of this invention is a system comprising a buoyancy structure having a gas compartment and a reinforcement device that integrates one or several compartments of gas lighter than air (hydrogen cells).

In addition, in some embodiments, the architecture for the structure of hydrogen cell (HC) of the present invention is one or a group of open structural modules that are obviously variable, mutually inclusive and capable of being used as units or in set as a system for future aerostat projects, based on modular architecture technology, so that the structure can support different safety standards and integrate the various modular parts in a flexible and economic architecture. In general, the lattice structures can be thought of as any repetitive cell structure, with a topology or basic structure that repeats—consistently or with some variation. The lattice structures offer a method to significantly reduce this complexity. Using a common cellular topology to fill the space of the design. Honeycomb structures are structures that have the geometry of a honeycomb to allow minimization of the amount of material used to achieve minimum weight and minimum cost of the material. The geometry of the honeycomb structures can vary widely, but the common feature of all these structures is a matrix of hollow cells formed between thin vertical walls. The cells are usually in column and hexagonal form.

Other examples are biomimetic designs based on the bones of the bird. The bone gains strength and flexibility of the material, but also from the way it deposits its structural elements in layers. In addition to the structural hierarchy and highly strong composition, the bones may evolve with slightly different shapes, sizes and angles. They have increased resistance to weight in many directions: vertical, horizontal and diagonal—and this internal variability makes the bones more resistant when accidents occur. The bones are solid on the outside, but empty inside. This makes them light and easy to move, and also extremely firm. For this purpose, although it has a fairly rigid outer surface. The partition in terms of macro and micro design, including lattice structures that connect the larger perimeter, creating a strong and efficient structure between two fixed points. The micro elements mimic the partition of bird bone, filling open spaces with grid structures. The resulting design is a web type pattern that forms a network of optimized load support points. The final configuration requires minimum material, the walls should be as light as possible and take up the least amount of space and ensure the amount of three-dimensional space closed to hydrogen gas.

Tensegrity structures are based on the combination of a few simple design patterns: members loaded only in pure compression or pure tension, which allows cables to be taut in tension, with mechanical stability, enabling the members to remain taut/compressed as the stress on the structure increases.

Single surface structural technique called shell structure, Shell Lace Structure, lattice-shell. The structural and manufacturing technique combines digital modeling, digital analysis with laser cutting manufacturing economy, transforming flat sheet materials into self-supporting structures. The iterative analysis yields highly efficient structures that respond to the environment and minimize the weight and waste. Shell Lace Structures are optimized through curvature, undulations and holes. The technique is inspired in nature; shells gain great strength from the curvilinear geometry, growing in thin layers over time, just where they need to. Curvatures, along with undulations, create rigidity. The holes minimize the weight by removing material where the structure does not require strength, bringing lightness. This facilitates the production of the inventive platform, because only a few different modules can then be combined specifically to provide the most appropriate platform for the design project.

As well as the other examples, this one is for illustrative purposes only and does not limit the invention in any way. Specialists in the art will appreciate that changes may be made in the embodiment forms described above, without straying from the broad inventive concept. It is understood, therefore, that this invention is not limited to particular embodiments described, but is intended to encompass modifications within the spirit and scope of this invention as defined by the claims.

For example, membrane structures can also be provided within the floating bodies.

The membrane structures are spatial structures made of taut membranes. The structural use of membranes can be divided into pneumatic structures, traction membrane structures and cable domes. In these three types of structure, the membranes work together with cables, columns and other members of the construction to find form.

Obviously, different shapes and/or connections in any one or more levels can be used infinitely in order to produce an infinite number of structures (e.g. Shell Lace Structure, lattice-shell, Membrane structures, tensegrity structures, lattice structure, Web-like structure and schwarzite structures) which may have different properties. It is beyond the scope of this work to list in detail the full spectrum of structures that can be constructed in this way.

In addition to the geometry-based diversity discussed above, for a given geometry, additional versatility can be introduced by different components and/or expansion levels of the system in different extensions.

Obviously, for any given geometry, there are many variations that can be made, which may have an effect on the general properties of the system.

The concept presented here could be used in a much wider variety of systems with a variety of properties and mechanical applications.

One of the most interesting features of these systems is that they could be designed to have a variable cell size and/or shape (FIG. 2).

The properties shown here are independent of scale, which means that the concept can be employed in any scale length, from the micro to the macro scale. The limitation of the work proposed here is that it is based on a model. For example, the systems should represent ideal fail-safe systems, which, for example, in (FIG. 7) are perfectly rigid squares of equal shape and size.

The systems being proposed here can be designed slightly differently, for example, through the use of membrane structure. In this work, we proposed a new structure-based airship system based on structure with a reinforcement mechanism and integration. It has been shown that these systems exhibit a wide range of properties including auxetic behavior, as well as the ability to have cells of different sizes that can be opened in several extensions.

BRIEF DESCRIPTION OF THE DRAWINGS

FIG. 7 is a perspective view of a plurality of reinforcement and integration structures according to an exemplary embodiment form of the present invention;

FIG. 10B is a partial perspective view of a plurality of partial reinforcement structures and integration according to an exemplary embodiment form of the present invention;

DETAILED DESCRIPTION

Figure 1:
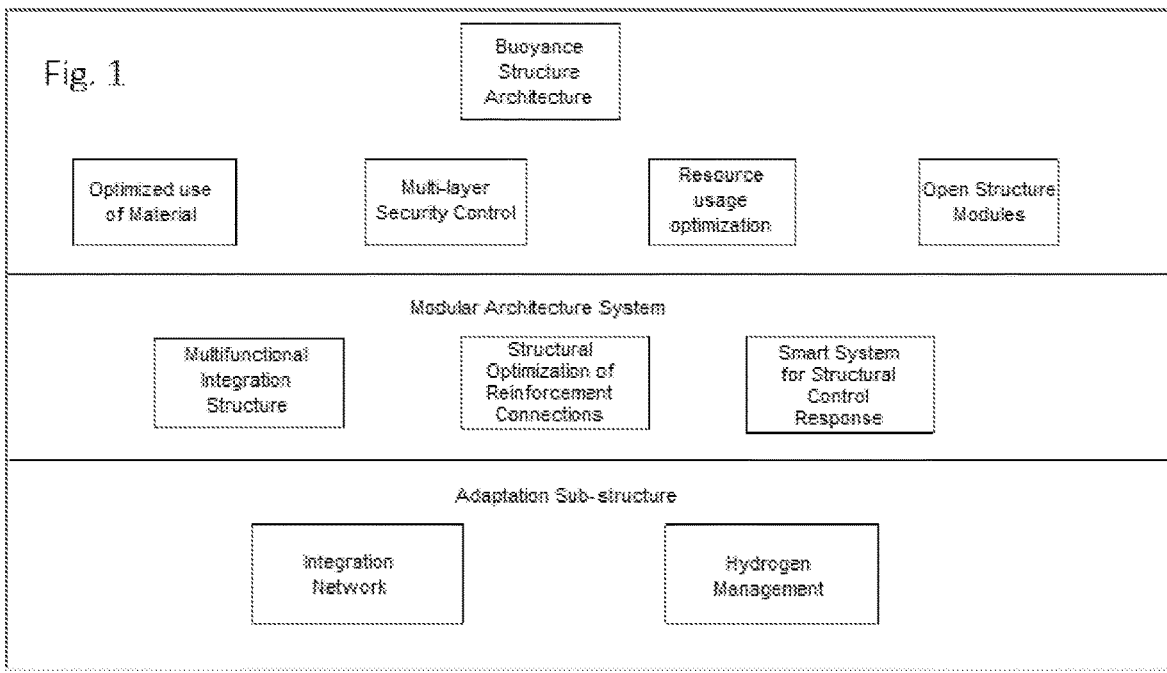
FIG. 1 is a functional block diagram of a system in which the present invention can operate.
Figure 2:
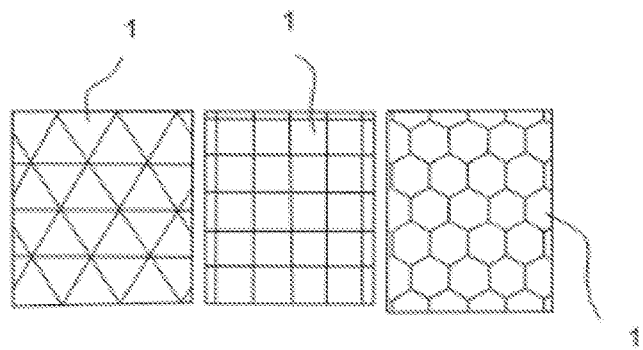
FIG. 2 is a cutaway view of a plurality of hydrogen cells with a lattice structure according to an exemplary embodiment form of the present invention.
Figure 3:
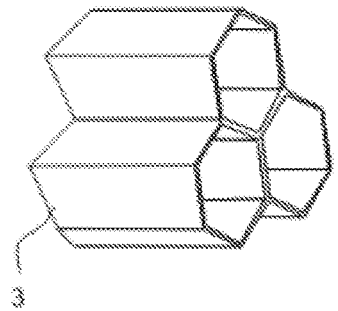
FIG. 3 is a schematic diagram of a plurality of hydrogen cells with a lattice structure according to an exemplary embodiment form of the present invention.
Figure 4:
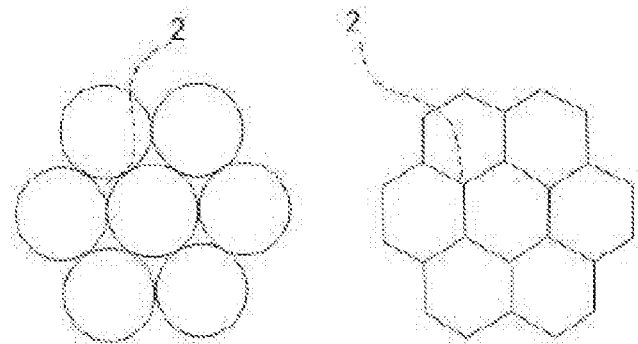
FIG. 4 is a cutaway view of a hydrogen cell with a basic hexagonal form according to an exemplary embodiment of the geometry-based diversity of the present invention.
Figure 5:
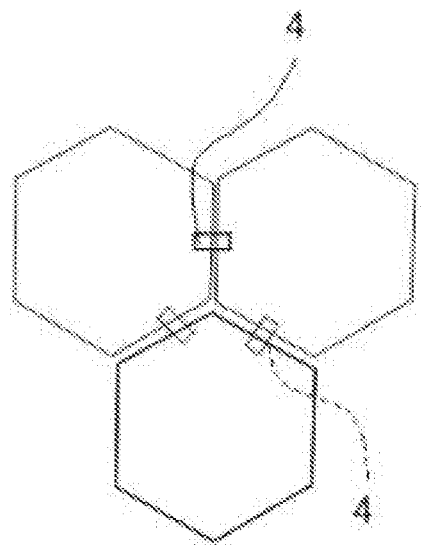
FIG. 5 is a cutaway view of a plurality of hydrogen cells with a lattice structure according to an exemplary embodiment form of the present invention.
Figure 6A:
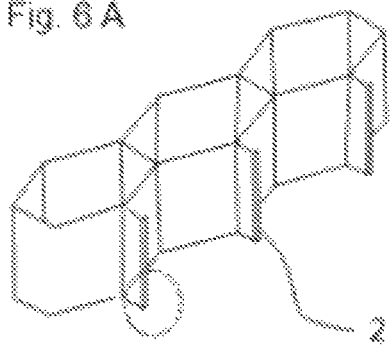
FIG. 6A is a partial perspective view of a plurality of hydrogen cells according to an exemplary embodiment form of the present invention.
Figure 6B:
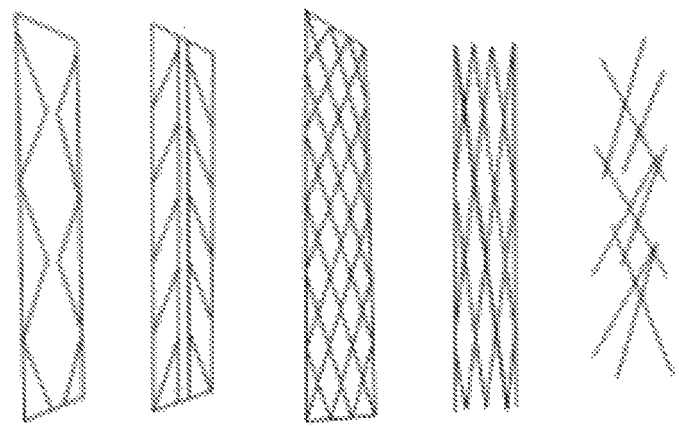
FIG. 6B is a cutaway view of a plurality of reinforcement and integration structures according to an exemplary embodiment form of the present invention.
Figure 8:
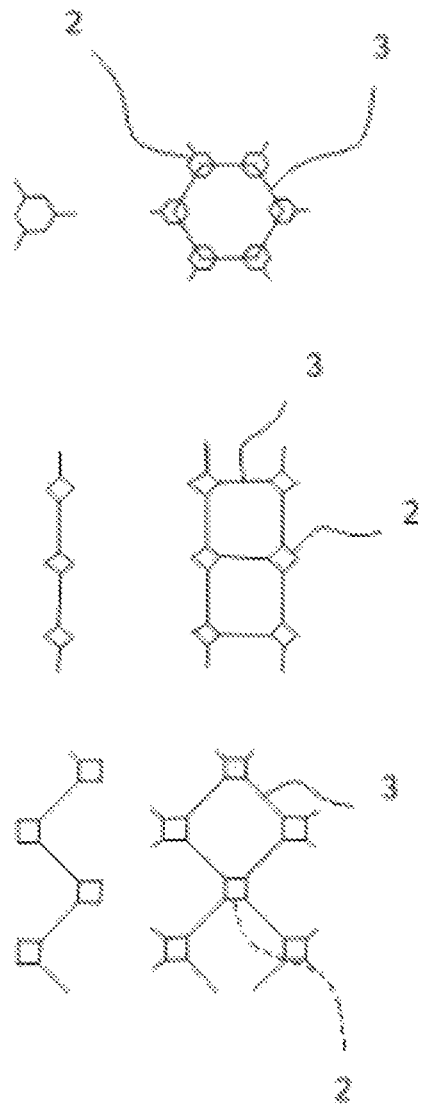
FIG. 8 is a cutaway view of a plurality of reinforcement and integration structures according to an exemplary embodiment form of the present invention.
Figure 9A:
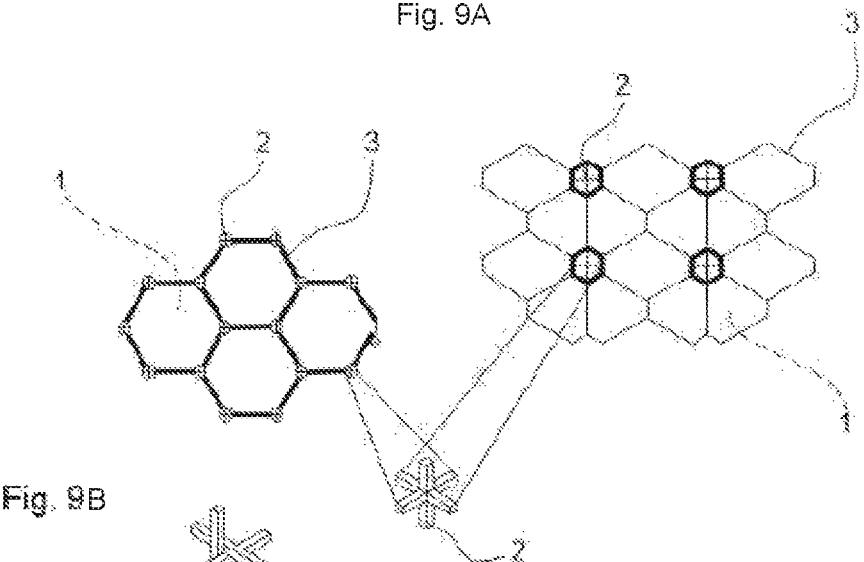
FIG. 9A is a diagram of wall surface of a plurality of reinforcement and integration structures according to an exemplary embodiment form of the present invention.
Figure 9B:
FIG. 9B is a perspective view of a reinforcement and integration structure according to an exemplary embodiment form of the present invention.
Figure 10A:
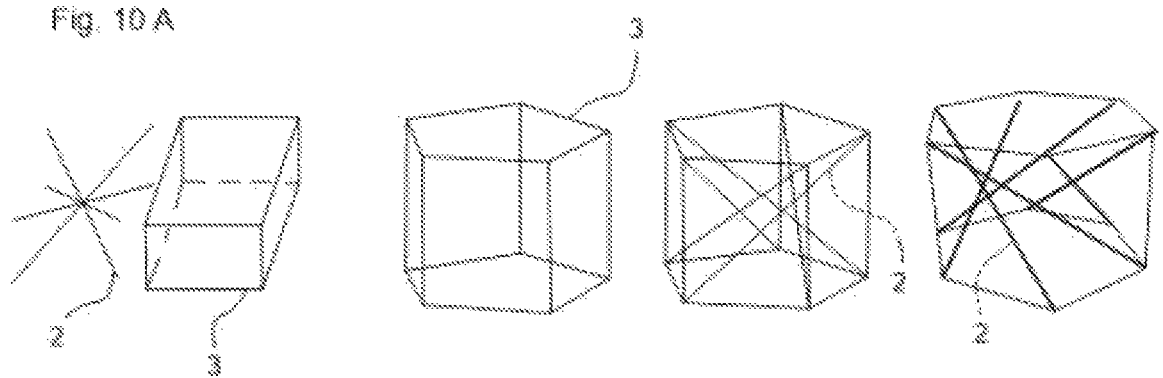
FIG. 10A is a perspective view of a plurality of reinforcement and integration structures according to an exemplary embodiment form of the present invention.
Figure 11:
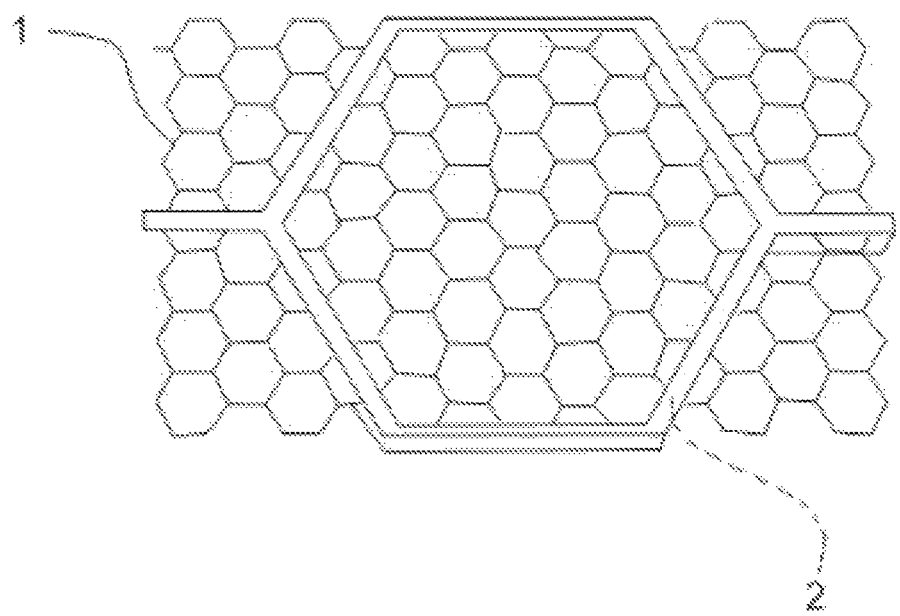
FIG. 11 is a cutaway view of a plurality of reinforcement and integration structures according to an exemplary embodiment form of the present invention.

The inherent simplicity of the Integration and Buoyancy Structure (IBS), highly tolerant to physical damage, suited for aircraft, along with the ability to use hydrogen as lifting gas, to generate static lift sufficient for flights and a special design that offers practically a zero mode of catastrophic failure, results in an advantage over the state of the art of aerostats. Inspired by nature and designed for a safe use of hydrogen, it will be customized to the needs of individual designers. By offering different levels of design within each purpose, the IBS can achieve the differential structural needs to operate a successful objective, giving more people access to the benefits of the aerostat and being environmentally sustainable.

In some embodiments, the hydrogen cell (HO) can be treated as an isolated structure. It is known that the border conditions imposed by a networked grid impact substantially the amount of energy that can be produced by blast and should be considered the rate of deformation of the material of the panels. In some embodiment forms, the cell endures beyond the limits of the early conditions of fire and explosion, the lateral pressure exerted by the approach of explosion or fire, cannot be transmitted from one floating body to the next, as is the case when the divisions by dividing walls are provided.

In some preferred embodiments, the different buoyancy power that arises in one or several cameras delivers how the platform with floating stability. In addition, one or more hydrogen cells (HC) can be attached to the reinforcement and integration structure element, e.g. lattice structure made of a material with low density and high strength, e.g. nano-structured metal alloys.

They increase, on the one hand, the safety in the event of a complete breakdown of the hydrogen cell, while on the other hand facilitate integration and hydrogen distribution of the buoyancy platform in operation.

The method describes a modular rearrangement scheme of or one or multiple hydrogen cells connected in network, capable of changing their interconnections.

One example provided is a set of hydrogen fuel cells that have high-safety hydrogen stored in it and can, for example, be manufactured to have a prismatic form arranged orthogonally regularly and arranged in an integral reinforcing structure, manufactured in a lattice shape.

One objective of the present invention is to provide a new type of hydrogen fuel cells with a very high volume and efficiency, at the same time, be able to withstand the pressure of the gas and change the pressure, and at the same time it allows cells of any size to be made, with modular extension in any of the three spatial directions.

In addition, another objective of this invention is to provide a buoyancy structure that includes high volume efficiency and prevents a fire or an explosion in a cell from spreading out, allowing the integration of a secondary reinforcement structure.

Another objective of the invention is to provide a container that is adequate to allow the buoyancy control.

A further object is to provide a concept of cells that is modular and scalable to any size by means of repetitive and modular elements.

Hereinafter, the technical ideas of this invention will be described in more detail with reference to accompanying drawings.

However, the accompanying drawings are just one example shown to explain in more detail the technical idea of the present invention and, therefore, the idea of this invention is not limited to accompanying drawings.

The basic hexagonal form can be modified to more general prismatic forms.

Using new innovative methods in connection with the generative design, offering different levels of volume, aerodynamics and buoyancy for the purpose, the resulting designs are optimized for performance and weight and can be as rigid or flexible as needed for the desired application, all designed to provide flexible and customized options at a small cost and a high-safety aircraft lighter than air. The generative design process, which focuses on the computing power to find optimized design solutions based on designer-defined parameters, is not just a way to increase quality and performance of the design but is also able to dramatically reduce the costs and materials in an effort to optimize manufacturing strategies.

In some embodiment forms, the modular structure of each hydrogen cell (HC) has its own internal microcontroller that records relevant physical parameters, such as temperature and the buoyancy state of the cell. As a result, each hydrogen cell (HC) knows what condition it is in. The hydrogen cells (HC) communicate with each other through wireless wiring or wiring between hydrogen cells (HC), like network communication. They can also communicate with other devices, such as the on-board computer, which uses the data from the cells to calculate the amount of buoyancy that the hydrogen cell (HC) has, the status of the cell. If a cell is empty, but the others still have hydrogen stored, aerostat does not need to stop, since a cell of hydrogen (HC) with lower capacity will unlikely affect the general breadth of an Integration and Buoyancy Structure (IBS). Instead, the empty hydrogen cell simply detaches itself from the group, acting as a bypass. The others continue to provide hydrogen, and the empty cells are replaced, and if a hydrogen cell (HC) malfunctions, there is no need to take the aircraft to the workshop. Since the aerostat can have more than one cell, it does not depend on any individual one. And in terms of repair, it is suffice just to replace the single cell of hydrogen (HC).

In many embodiment forms, the smart control network will feel the need and will make the perfect adjustment, providing control of volume, temperature, pressure, hydrogen, stability, buoyancy and flight control as needed.

This network will be incorporated into the structural materials. As a smart system, they can perform numerous functions, recognizing the environment, using systems of sensors and actuators that give the structure a certain level of artificial intelligence, allowing them to adapt to needs of the IBS.

In many embodiment forms, the structure may also comprise multiple sensors for altitude, position and actuator to provide a buoyancy control and specified flight control, a control system that accompanies the computer vision system, which combines data from all the sensors, monitoring their weaknesses, a module, or subsystem intended to detect events or changes in the environment and send the information to other electronic components. The Integration and Buoyancy Structure (IBS) comes with totally redundant systems, which means that if one fails, another is ready to back up, it must guard against mishaps. This is the importance of IBS' redundant mechanical systems, flight systems, buoyancy systems, sensor systems and computer systems.

In some embodiment forms, the object of the present invention is therefore the provision of a buoyancy platform with a smart system for Structural Control Response, buoyancy properties and particularly has better protection against effects due to flammability and explosive reactions.

Technological advances and efficient devices offering alternatives to improve safety and performance (against weather and pressure demands) of a new structural system of aerostat. The use of control and monitoring devices to design smart structures that not only rely on their own strength to withstand weather and pressure demands, but also on such devices or systems to dissipate dynamic energy without sustaining significant deformation. In addition to and in conjunction with the control, a quick and accurate assessment of damage monitoring is of paramount importance. It presents base isolation systems (cutting the transmission of kinetic energy of the shock waves and thermal diffusion to the structure), control systems (applying a control force to produce additional buffering mechanism using tendons or bracings.

In some embodiments, the smart control would regulate buoyancy of the aerostat, thus having a dynamic response like a smart hydrogen network—each cell can change in seconds—and can react dynamically to different buoyancy levels throughout the flight, which means that the buoyancy levels of the aerostat would remain constant during variations in atmospheric pressure and temperature. One of the objectives of Integration and Buoyance Structure (IBS) is to design a smart architecture adjustable to a network to control the buoyancy, temperature, pressure, humidity, stability and flight control of the aerostat. The hydrogen pumping through a network of channels allows the buoyancy control of functional modules. The channels can be compared to the cardiovascular system, for example.

In some embodiments, the Integration and Buoyancy Structure (IBS) and the responsive hydrogen cell (HC) combine insulation, cover and structural protection (subject to stress and tension) with an integrated network that pulsates through it, which can identify and respond to the specific needs of each HC.

In some embodiments, the lattice and honeycomb structure and the integration network will create the perfect combination of strength, lightness and space. It is lightweight and strong, because its network structure has voltage only when necessary, leaving space available. By using lattice structures, the structure has the necessary strength, but can also take advantage of the extra space when needed.

In some embodiments, a crack in a hydrogen cell (HC) will not damage the Integration and Buoyancy Structure (IBS) combination because it has a chain of other hydrogen cells as backup. The grid can redirect hydrogen from cell to cell. Hydrogen can be concentrated in special cells for volume control.

In some embodiments, the structure, called and Integration and Buoyancy Structure (IBS), is an open-cell 3D structure composed of lattice structures, tensegrity or membrane structures of empty, interconnected cells. In addition to its ultra-low density, the cellular architecture of the material gives rise to an unprecedented mechanical behavior for an aerostat, including recovery from compression and high voltage power absorption, vibration or shock energy buffering.

In some embodiments, improved system performance is obtained by using channels for the exchange of hydrogen, fluid cells and a series of ducts, channeled through the system like a fluid hydrogen grid.

In some embodiment forms, the tube connections extend from at least one device for generating pressurized hydrogen, so as to provide a uniform deposit on the floating bodies.

In some embodiment forms, the channels can be incorporated into the hard or soft materials, depending on the purpose of use. For example, the consistency and the form of a smooth and elastic film are more suitable for integration in a membrane structure compared to a rigid one, which, in turn, is better for a lattice structure platform.

In some embodiments, light longitudinal integration structures such as channels can be added between the panels, giving the internal structure the appearance of a huge bird cage or web-like structure.

In some embodiments, if the construction so allows, the floating bodies can have pressure relief valves to prevent excess stretching to prevent the breakup of floating bodies in case of breakdowns or overpressure.

In many embodiment forms, a membrane-like coated cover controls the amount of UV radiation, humidity, temperature and gas permeability.

DETAILED DESCRIPTION OF THE MAIN ELEMENTS

1: Hydrogen cell
2: Reinforcement and integration structure
3: Exterior wall
4: Secondary reinforcement and integration part
5: Internal microcontroller

The invention claimed is:

1. A system for reinforcing aerostats, comprising:
an Integration and Buoyance Structure (IBS), the IBS including multiple interfaces and cells, the interfaces and cells comprising a plurality of open structure modules formed in the IBS that are extendable, reshapeable, and removable;
a connection reinforcement structure comprising at least one of a shell lace structure, a lattice shell, membrane structures, tensegrity structures, a lattice structure, a web-like structure, and schwarzite structures, wherein the reinforcement structure is adjustable jointly and in individual sections;
a smart control system that governs structure response control with respect to climatic effects, flammability of hydrogen, and explosive reactions;
a hydrogen management controller; and
a plurality of hydrogen cells, each hydrogen cell of the plurality of hydrogen cells integrating and coupling at least one gas cell in the multiple interfaces and cells to the connection reinforcement structure; wherein
each hydrogen cell is arranged in each of the plurality of open structure modules and has an internal microcontroller that records relevant physical parameters of the hydrogen cell, the internal microcontroller being in informational communication with an internal microcontroller of at least one other hydrogen cell of the plurality of hydrogen cells.

2. The system of claim 1, further comprising:
a hydrogen generator, the hydrogen generator producing hydrogen in a predetermined amount and at a predetermined time using at least one of an electrical reaction, heat reaction, and chemical reaction.

3. The system of claim 2, wherein the chemical reaction comprises an aluminum alloy and gallium added to water when the aerostat is in flight to generate hydrogen.

4. The system of claim 1, further comprising:
a buoyancy management controller,
an energy management controller,
a processing management controller,
a stability management controller;
a flight control management controller;
and a channel or tube management controller.

5. The system of claim 1, further comprising:
network integration elements that interface with one or more management controllers, the network integration elements comprising buoyancy control elements, temperature control elements, volume control elements, connection elements, network elements, an operating system (OS) and equipment/operating elements.

* * * * *